United States Patent
Kotay et al.

(10) Patent No.: US 11,184,767 B2
(45) Date of Patent: Nov. 23, 2021

(54) METHODS AND SYSTEMS FOR AUTOMATICALLY CONNECTING TO A NETWORK

(71) Applicant: COMCAST CABLE COMMUNICATIONS, LLC, Philadelphia, PA (US)

(72) Inventors: Sreekant Kotay, Philadelphia, PA (US); John Robinson, South Riding, VA (US); Jacob Gladish, Blue Bell, PA (US); Robert Seamon, Sicklerville, NJ (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 359 days.

(21) Appl. No.: 15/787,436

(22) Filed: Oct. 18, 2017

(65) Prior Publication Data

US 2018/0115892 A1 Apr. 26, 2018

Related U.S. Application Data

(60) Provisional application No. 62/411,277, filed on Oct. 21, 2016.

(51) Int. Cl.
*H04W 12/06* (2021.01)
*H04W 12/04* (2021.01)
*H04L 29/06* (2006.01)
*H04W 12/08* (2021.01)
*H04W 12/30* (2021.01)

(52) U.S. Cl.
CPC .......... *H04W 12/06* (2013.01); *H04L 63/0428* (2013.01); *H04W 12/04* (2013.01); *H04W 12/08* (2013.01); *H04W 12/35* (2021.01)

(58) Field of Classification Search
CPC ...................................... H04W 12/06
See application file for complete search history.

(56) References Cited

U.S. PATENT DOCUMENTS

| | | | |
|---|---|---|---|
| 7,568,092 B1 * | 7/2009 | Englund | H04L 63/102 380/255 |
| 8,601,317 B2 | 12/2013 | Sugaya | |
| 8,631,471 B2 * | 1/2014 | Dattagupta | H04W 12/08 726/4 |
| 8,903,318 B2 | 12/2014 | Adamovsky et al. | |
| 8,931,067 B2 | 1/2015 | Haddad et al. | |
| 9,178,868 B1 | 11/2015 | Leung et al. | |
| 9,241,367 B2 | 1/2016 | Chen et al. | |
| 2005/0181734 A1 * | 8/2005 | Coutts | H04W 48/18 455/67.16 |
| 2006/0236105 A1 * | 10/2006 | Brok | H04W 12/50 713/169 |

(Continued)

*Primary Examiner* — Bradley W Holder
(74) *Attorney, Agent, or Firm* — Ballard Spahr LLP

(57) ABSTRACT

Systems and methods are described for connecting a user device to a wireless network despite the user device lacking the correct network credentials to access the wireless network. If the user device is unable to connect to a first network due to an incorrect network credential, the user device can automatically connect to a second network to obtain the correct network credentials associated with the first network. The network credentials associated with the first network can enable the user device to then connect and/or reconnect to the first network.

20 Claims, 8 Drawing Sheets

(56) References Cited

U.S. PATENT DOCUMENTS

| | | | | |
|---|---|---|---|---|
| 2006/0270350 A1* | 11/2006 | Kim | ................... | H04W 68/00 |
| | | | | 455/41.2 |
| 2007/0021104 A1* | 1/2007 | Kim | ................... | H04L 63/08 |
| | | | | 455/411 |
| 2007/0082659 A1* | 4/2007 | Nevalainen | ....... | H04M 1/72527 |
| | | | | 455/418 |
| 2007/0130296 A1* | 6/2007 | Kim | ................... | H04W 76/11 |
| | | | | 709/220 |
| 2010/0115108 A1* | 5/2010 | Wang | ............... | H04W 12/003 |
| | | | | 709/228 |
| 2011/0013569 A1* | 1/2011 | Scherzer | ........... | H04W 48/14 |
| | | | | 370/329 |
| 2011/0171909 A1* | 7/2011 | Jung | ............... | H04W 48/16 |
| | | | | 455/41.2 |
| 2012/0044863 A1* | 2/2012 | Huang | ............. | H04W 84/12 |
| | | | | 370/328 |
| 2012/0317619 A1* | 12/2012 | Dattagupta | ...... | H04W 12/50 |
| | | | | 726/4 |
| 2013/0219032 A1* | 8/2013 | Hsu | ............... | H04W 52/0274 |
| | | | | 709/222 |
| 2014/0064198 A1* | 3/2014 | Pan | ................... | H04W 76/10 |
| | | | | 370/329 |
| 2016/0037439 A1* | 2/2016 | Shamis | ........... | H04W 40/244 |
| | | | | 370/329 |

* cited by examiner

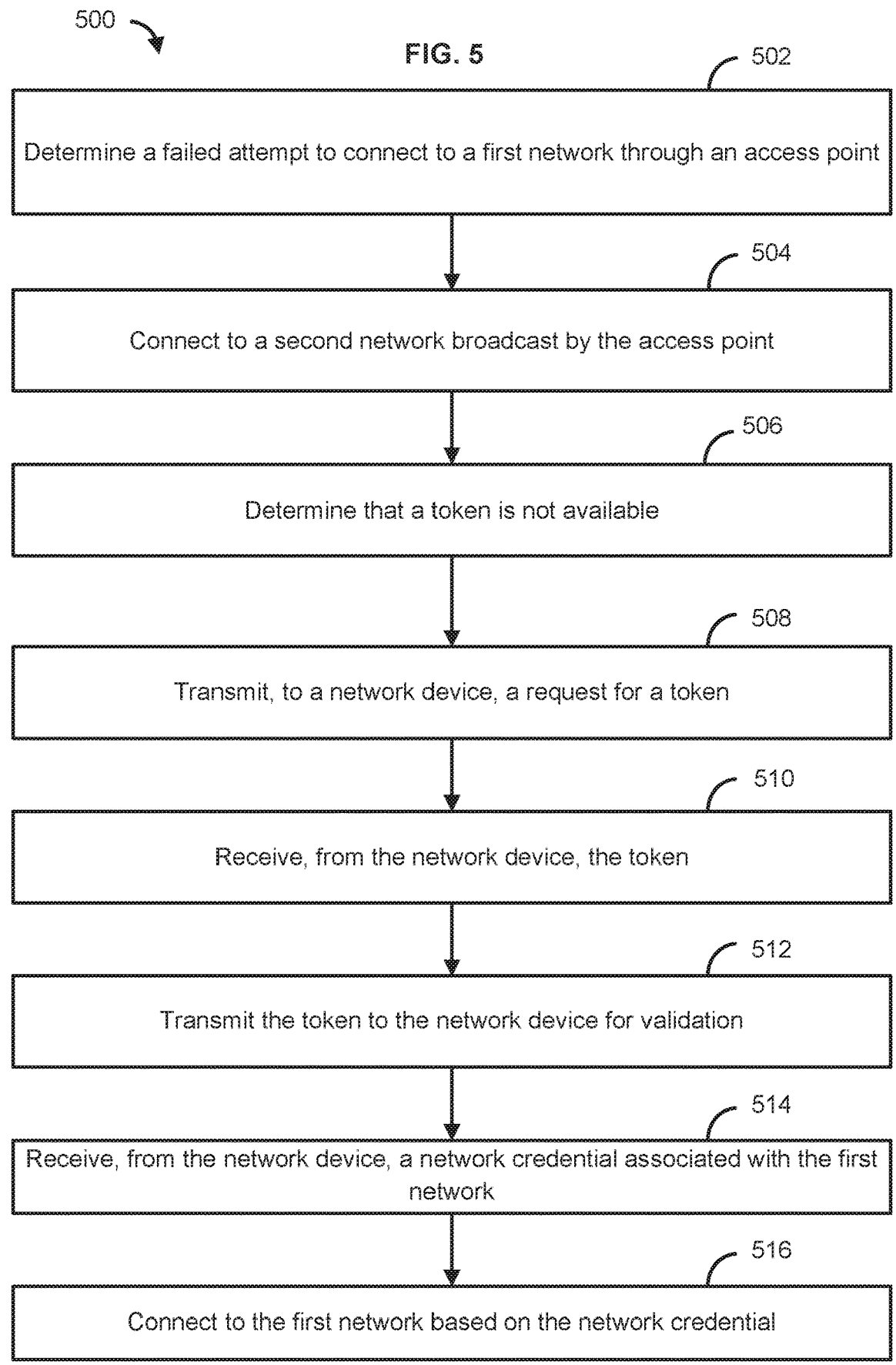

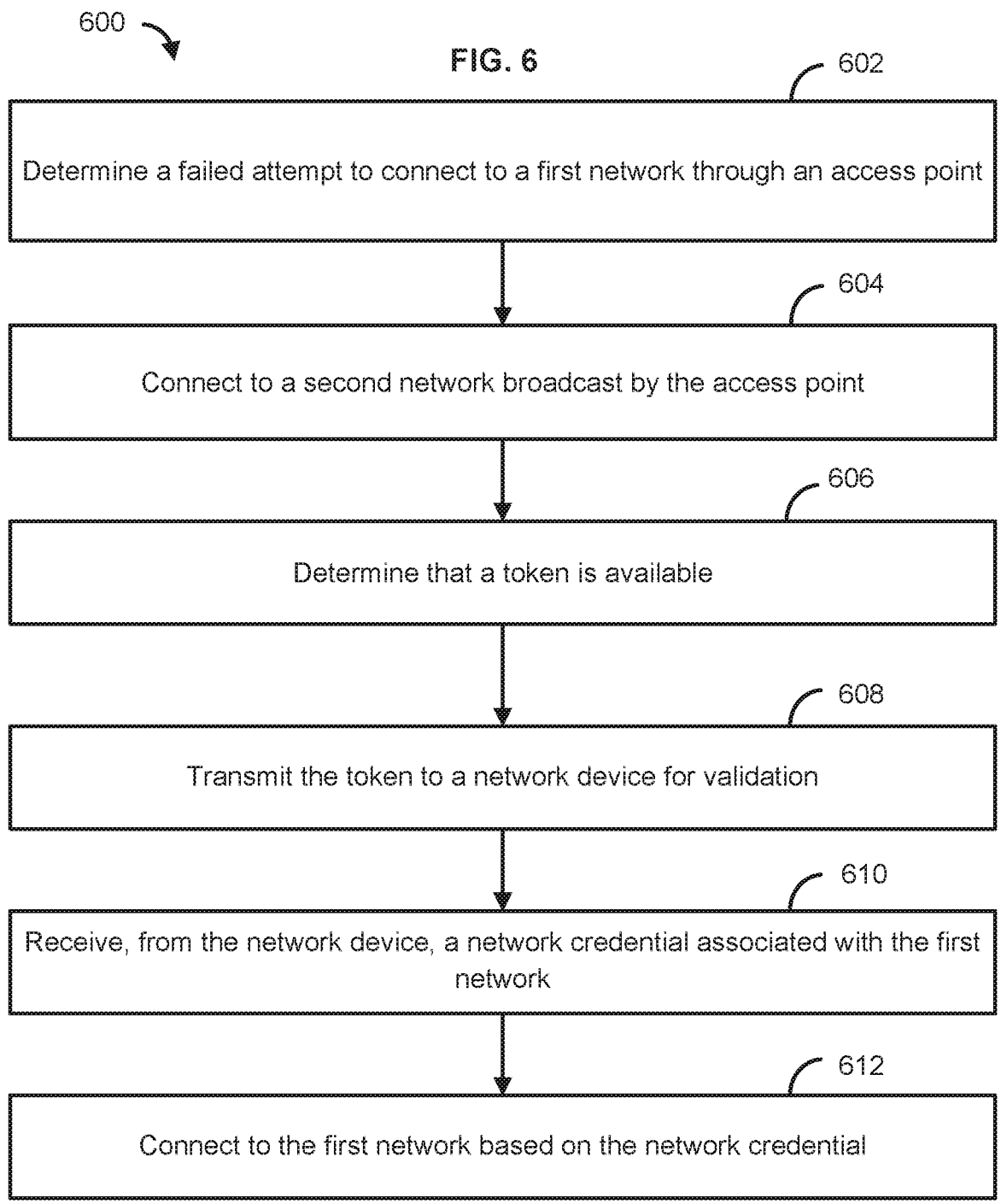

702: Receive a request for a token from a user device unable to connect to a first network 704: Determine that the user device is associated with an account authorized to access the first network 706: Transmit a token to the user device 708: Receive, from the user device, a request to validate the token 710: Validate the token 712: Transmit, to the user device, a network credential that enables the user device to connect to the first network

METHODS AND SYSTEMS FOR AUTOMATICALLY CONNECTING TO A NETWORK

CROSS REFERENCE TO RELATED APPLICATION

This application claims priority to U.S. Provisional Application No. 62/411,277 filed Oct. 21, 2016, herein incorporated by reference in its entirety.

BACKGROUND

Currently, wireless communication devices have to be manually configured with a Wi-Fi service set identifier (SSID) and password of a Wi-Fi access point (AP) in order to access a network. In the event that the SSID or password is changed for the AP, each wireless communication device accessing the network through the AP must be manually reconfigured to regain access to the network. Manual configuration of wireless communication devices is a tedious task. What is needed is a way to easily connect the wireless communication devices to the AP that minimizes the impact of changes in SSIDs and/or passwords. These and other shortcomings are addressed by the present disclosure.

SUMMARY

It is to be understood that both the following general description and the following detailed description are exemplary and explanatory only and are not restrictive. Provided are methods and systems for methods and systems for onboard provisioning, connecting, and reconnecting a wireless communication device to a wireless network.

The disclosed methods and systems can be applied to wireless communication devices (e.g., user devices) that can be configured with a network identifier (e.g., service set identifier (SSID)) and security element (e.g., password) associated with a wireless access point (AP) to connect to a wireless network. In an aspect, a user device can determine that the user device is unable to connect to a first network through an access point using a stored first identifier and stored first password. For example, the identifier for the first network may have been changed, the password may have been changed, or both. The user device can then determine if a token is locally stored and, if so, the user device can transmit the token to a validation server by first connecting to a second network through the access point using a stored second identifier and stored password. The second network can be configured for the specific purpose of providing a secure connection for provisioning the user device to access the first network (or another network). The token can contain data that identifies one or more of the user device, the user, and/or the first network. The validation server can maintain a database of user accounts and network credentials associated with those user accounts. The network credentials can include, for example, identifiers and passwords for networks associated with users of the user accounts. Whenever a change is made to a network, such as a change in identifier and/or a change in password, the changes can be transmitted to the validation server, associated with the user/user account, and stored in the database. Upon receipt of the token, the validation server can use the token to determine a user/user account associated with the token, determine the network credentials associated with the user/user account, and transmit the network credentials back to the user device. The user device can then disconnect from the second network and use the received network credentials to automatically reconnect to the first network.

In the event the user device determines that no token is locally stored, the user device can request a token by connecting to the second network through the access point using the stored second identifier and the stored password. Once the user device is connected to the second network, the user device can transmit the request for the token to the validation server. The request can comprise data such as a user login, a user password, a device identifier, combinations thereof, and the like. The validation server can use the data to determine that the user device is authorized to access the first network and can transmit the token to the user device. The user device can then transmit the token back to the validation server as described above to obtain network credentials for the first network.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 5 is a flowchart illustrating an example method;
FIG. 6 is a flowchart illustrating an example method;
FIG. 7 is a flowchart illustrating an example method.

DETAILED DESCRIPTION

Figure 1:
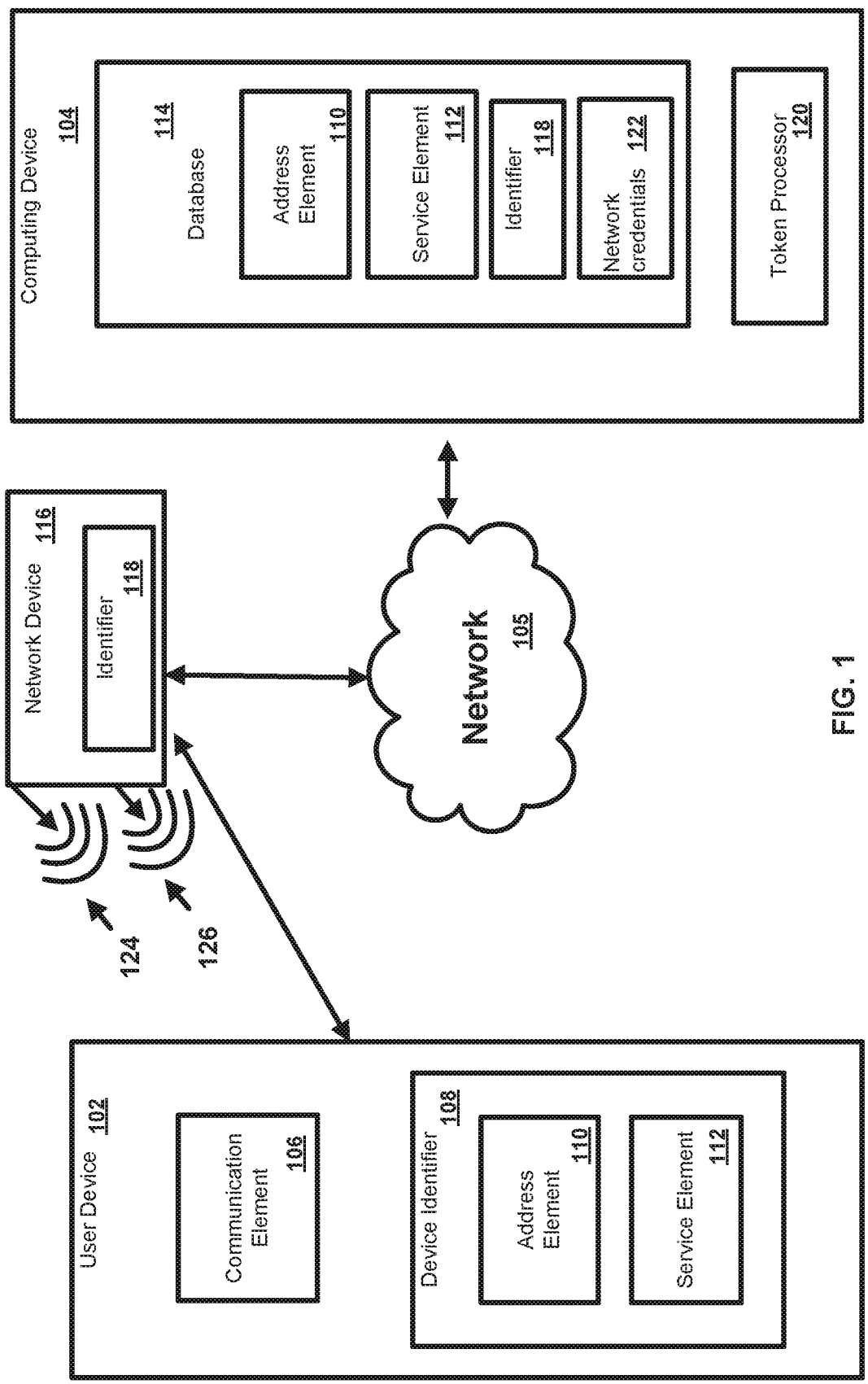
FIG. 1 is a block diagram of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for connecting a wireless communication device to a wireless network, despite a change in a network credential associated with the wireless network, without requiring manual reconfiguration of the wireless communication device. Wireless communication devices can be provisioned with a network identifier (e.g., service set identifier (SSID)) and security element (e.g., password) associated with a wireless access point (AP) to connect to a wireless network. A wireless communication device can be configured to detect an inability to connect to a wireless network provided by an access point, automatically connect to the access point using a fixed (e.g., permanent, non-changing, etc.) identifier to access a dedicated network for obtaining network credentials needed to access the wireless network without manually configuring such network credentials on the wireless communication device.

In one aspect of the disclosure, a system can be configured to provide services such as network-related services. FIG. 1 illustrates various aspects of an exemplary environment in which the present methods and systems can operate. The present disclosure is relevant to systems and methods for providing services to a user device (e.g., a computing device) or a device that serves a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104 (e.g., a remote computing device, a server, etc.). The computing device 104 can be disposed locally or remotely relative to the user device 102. As an example, the user device 102 and the computing device 104 can be in communication via a network 105. The network 105 can comprise one or more networks, such as a wide area network (e.g., a provisioning network, a content network, service network, provider network, a first network, a second network, the Internet), a public network, an open network, a provider managed network, a non-user managed network, a provider controlled network, a non-user controlled network, a local network, a private network, a closed network, a user managed network, a user controlled network, a user deployed network, and/or the like. Other forms of communications can be used, such as wired and wireless telecommunication channels, for example.

In an aspect, the user device 102 can be a wireless communication device, such as a computer, a smartphone, a laptop, a tablet, a set top box, a display device, or other device capable of communicating with the computing device 104. The user device 102 can be a computing device. As an example, the user device 102 can comprise a communication element 106 for providing an interface to a user to interact with the user device 102 and/or the computing device 104. The communication element 106 can be any interface for presenting information to the user and receiving a user feedback, such as an application client or a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device, such as the computing device 104.

In an aspect, the user device 102 can be associated with a user identifier or device identifier 108. As an example, the device identifier 108 can be any identifier, token, character, string, or the like, for differentiating one user and/or user device (e.g., user device 102) from another user or user device. In a further aspect, the device identifier 108 can identify a user or user device as belonging to a particular class of users or user devices. As a further example, the device identifier 108 can comprise information relating to the user device, such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and/or a service element 112. In an aspect, the address element 110 can be an internet protocol address, a MAC address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network and/or location.

In an aspect, the service element 112 can comprise an identification of a service provider associated with the user device 102 and/or with the class of user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. In an aspect, the address element 110 can be used to identify or retrieve the service element 112, or vice versa. As a further example, one or more of the address element 110 and the service element 112 can be stored remotely from the user device 102 and retrieved by one or more devices, such as the user device 102 and the computing device 104. Other information can be represented by the service element 112.

In an aspect, the user device 102 can be store network credentials 122. The network credentials 122 can comprise information such as SSMs, passwords, security settings, combinations thereof, and the like for one or more networks and/or network devices to which the user device 102 is authorized to connect. For example, the network credentials 122 can comprise network credentials for accessing a network device 116. In an aspect, some or all of the network credentials 122 can be stored in an encrypted or hashed form.

In an aspect, the network device 116 can be in communication with a network, such as a network 105. As an example, the network device 116 can facilitate the connection of a device, such as the user device 102, to the network 105. As a further example, the network device 116 can be configured as a network gateway and/or an access point. In an aspect, the network device 116 can be configured to allow one or more wireless devices to connect to a wired and/or wireless network using Wi-Fi, Bluetooth or similar standard.

In an aspect, the network device 116 can be configured as a mesh network. As an example, the network device 116 can comprise a multi-band wireless network device. As an example, the network device 116 can be configured with a first service set identifier (SSID) to function as a local network for a particular user or users (e.g., associated with a user network or private network). As a further example, the network device 116 can be configured with a second service set identifier (SSID) (e.g., associated with a public/community network, hidden network, or limited services (e.g., provisioning) network) to function as a secondary network or redundant network for connected communication devices. The network device 116 can be accessed through the use of network credentials 122. The network credentials 122 can be stored on the network device 116 and can comprise information such as SSIDs, passwords, security settings, combinations thereof, and the like. In an aspect, some or all of the network credentials 122 can be stored in an encrypted or hashed form.

In an aspect, the network device 116 can comprise an identifier 118. As an example, the identifier 118 can be a media access control address (MAC address). As a further example, the identifier 118 can be a unique identifier for facilitating communications on the physical network segment. In an aspect, each of the network device 116 can comprise a distinct identifier 118. As an example, the identifiers 118 can be associated with a physical location of the network device 116.

The network device 116 can be in communication with the computing device 104 to provide the computing device 104 with up-to-date network credentials 122. The network device 116 can be configured to transmit the network credentials 122 to the computing device 104 upon detecting a change in the network credentials 122 or the network device 116 can transmit the network credentials 122 to the computing device 104 periodically (e.g., every hour, every day, etc. . . . ). In an aspect, the network device 116 can transmit the identifier 118 with the network credentials 122 to aid in proper updating of data stored in the database 114. In an aspect, the computing device 104 can be a server for communicating with the user device 102 through the network 105 via the network device 116. As an example, the computing device 104 can communicate with the user device 102 for providing services. In an aspect, the computing device 104 can allow the user device 102 to interact with remote resources, such as data, devices, and files. As an example, the computing device can be configured as central location (e.g., a headend, or processing facility), which can receive content (e.g., data, input programming) from multiple sources. The computing device 104 can combine the content from the various sources and can distribute the content to user (e.g., subscriber) locations via a distribution system.

In an aspect, the computing device 104 can manage the communication between the user device 102 and a database 114 for sending and receiving data therebetween. For example, the user device 102 can request and/or retrieve a file from the database 114. In an aspect, the database 114 can store information relating to the user device 102 (such as the address element 110, and/or the service element 112), information related to a user of the user device 102 (such as user account information 124), network credentials 122 related to one or more networks/network devices that the user/user device 102 access (e.g., a network device 116). The network credentials 122 can comprise information such as SSIDs, passwords, security settings, combinations thereof, and the like for one or more networks and or network devices utilized by users and/or user devices for which user account information is stored. For example, the network credentials 122 can comprise network credentials for accessing the network device 116 or one or more other network devices.

As an example, the computing device 104 can obtain the device identifier 108 from the user device 102 and retrieve information from the database 114, such as the address element 110 and/or the service elements 112. As another example, the computing device 104 can obtain the address element 110 from the user device 102 and can retrieve the service element 112 from the database 114, or vice versa. As another example, the computing device 104 can obtain the device identifier 108 from the user device 102 and can retrieve user account information and/or network credentials associated with the network device 116. As a further example, the computing device 104 can obtain a MAC address from the user device 102 and can retrieve a local IP address from the database 114. As such, the local IP address can be provisioned to the user device 102, for example, as the address element 110 to facilitate interaction between the user device 102 and a network (e.g., LAN). Any information can be stored in and retrieved from the database 114. The database 114 can be disposed remotely from the computing device 104 and accessed via direct or indirect connection. The database 114 can be integrated with the computing system 104 or some other device or system. In an aspect, the computing device may be configured as other devices, such as a user device or a network device, for example.

The computing device 104 can receive network credentials 122 from the network device 116. The computing device 104 can determine what user account information 124 is associated with the network device 116 and update the network credentials 122 stored in the database 114 accordingly.

The computing device 104 can comprise a token processor 120. The token processor 120 can be configured to generate a token, validate a token, and the like. A token may be generated in response to a request received from the user device 102. A token may be generated in response to creation of a user account and/or storage of user account information in the database 114. In an aspect, a user may request a new token to be generated and also at the same time identify the data that is to be shared using the token (e.g., identify one or more networks for which network credentials should be shared).

The token processor 120 can create an identifier for the token that can be used to access the data from the database 114. Examples of an identifier include a pointer or reference to a storage location in the database 114, an index to the storage location in the database 114, a URL, the device identifier 108, the address element 110, the service element 112, combinations thereof, and the like. In one embodiment, a globally unique identifier can be generated. Various different techniques such as calculating a cryptographic hash of the data, etc, may be used to generate the identifier for the token. In an aspect, the data in the database 114 may be encrypted.

The token processor 120 can create a unique encryption key for the token. The encryption key can be, for example, a symmetric encryption key which can be used to encrypt data and also to decrypt the encrypted data. Some or all of the data in the database 114 can then be encrypted using the encryption key. For example, only data associated with the user and/or user device 102 that requested the token can be encrypted using the encryption key. Various different encryption technologies may be used. In an aspect, the generated token can thus comprise information such as the identifier and can be encrypted with and/or can include the encryption key. In another aspect, the generated token is not encrypted and does not comprise an encryption key.

The token processor 120 can determine whether a token is valid. Token validity can be determined by determining one or more conditions, such as length of time a token can be valid, a number of validation requests for which a token can be valid, a particular network that the token is being used to request access to, combinations thereof, and the like. Additionally, validating the token can comprise verifying that the token is transmitted by a proper authority the computing device), and/or verify that the token is in proper form (e.g., proper data structure, proper format, properly encoded, not expired, not used more than a threshold number of times, etc.). In another aspect, validating the token can comprise verifying that token comprises data/information that correlates to data/information stored by the computing device 104. Further, validating the token can comprise the computing device 104 determining whether the token has been previously revoked, marked invalid, or otherwise rejected.

In operation, the user device 102 (e.g., a computing device, a smartphone, a laptop, a tablet, a set top box, a display device, etc.) can connect to a first network, such as a LAN associated with a first SSID, via the network device 116. As an example, the user device 102 can discover a beacon 124 containing the SSID (e.g., the first SSID) transmitted (e.g., wirelessly) by the network device 116. The beacon can comprise information to facilitate a connection between the user device 102 and the network device 116.

In an aspect, the beacon and/or the SSID can be transmitted over one or more channels or frequency bands. The user device 102 can be configured to support 2.4 GHZ, and 5 GHZ bands for Within the 2.4 GHz band, multiple channels (e.g., channels 1-11 (in the United States) and 1-14 (outside the United States) can be used. The 2.4 GHz band can comprise 2412 MHz-2484 MHz. The 5 GHz band can comprise one or more channels governed by many possible regulations between channel 7 and 196, for example, between 4915 MHz and 5825 MHz. Any number of channels where regulations allow can be used to broadcast a beacon and transmit data.

In an aspect, the user device 102 may be unable to connect to the first network via the beacon 124. For example, the SSID and/or password stored in the network credentials 122 for the first network no longer matches the SSID and/or password for the first network stored and used as the network credentials 122 by the network device 116. The user device 102 can connect to a second network via a beacon 126. The first network and the second network can be associated with and/or a part of a single physical network, such as a local area network and/or a wide area network, for example. The first network and the second network can be different physical signaling sublayers of a physical network. For example, the first network and the second network can be associated with different channels of a physical layer component (e.g., coaxial cable, T1 cable T3 cable, Ethernet, fiber, etc . . . ). The second network can be configured to provide less functionality than the first network. For example, the second network can be configured to provide only a provisioning function to enable the user device 102 to connect to the first network. The second network can be a subnetwork of the first network. The first network can be a subnetwork of the second network. The first network and the second network can be subnetworks of a third network. The first network and the second network can be networks within and/or associated with the third network. The first network and the second network can be part of a single network (e.g., the third network).

The first network and the second network can be two independent wireless networks (e.g., WLANs) created using a single access point (e.g., network device 116, access point 204 (FIG. 2), access point 305 (FIG. 3), access point 405 (FIG. 4), etc . . . ). It should be noted that more than two networks are also contemplated. The single access point can be configured to support two WLAN networks in a dual frequency channel scheme. A beacon frame (e.g., the beacon 124, the beacon 126, beacon 207a (FIG. 2), beacon 207b (FIG. 2), etc . . . ) can be understood as a management frame in IEEE 802.11 based WLANs. The beacon frame can contain some or all the information about a network. Beacon frames can be transmitted periodically to announce the presence of a Wireless LAN network. Beacon frames can be transmitted by the access point, e.g., the network device 116, the access point 204 (FIG. 2), the access point 305 (FIG. 3), and the access point 405 (FIG. 4), in an infrastructure BSS.

The proliferation of wireless communications has produced dense networks of access points that share the same communication (e.g., transmission, radio, network, etc . . . ) environment, creating a phenomenon known as co-channel interference. Transmission of real time services, like video-streaming or any high data rate services, can be hampered by the interference created by nearby wireless LAN transmitting devices.

In this situation it becomes advisable to work in the best operating frequency channel, the less interfered one. In the case when the channel is dynamically interfered a method for changing to the best frequency channel can be used. Working in the less interfered channel entails an improvement in WLAN link performance, achieving better received signal-to-noise ratio (SNR) and communication throughput. A technique for increasing throughput and avoiding interference is to have a dual transceiver in WLAN devices (e.g., the network device 116, the access point 204 (FIG. 2), the access point 305 (FIG. 3), the access point 405 (FIG. 4), etc.), which allows supporting WLAN communications in other frequency bands or channels, if the first one is interfered. In addition, it can be useful to prioritize the wireless transmissions that the user considers of high priority. This can be achieved by assigning a non-interfered, or lightly interfered, channel, leaving the other interfered channels for low priority WLAN transmissions.

In IEEE 802.11, Wireless LAN Medium Access Control (MAC) and Physical Layer (PHY) Specifications IEEE 802.11-2016 incorporated herein by reference in its entirety, a variable length SSID field can contain an identity of an extended service set (ESS). The maximum length is 32 bytes, and when the SSID has a length of zero, it is considered to be the broadcast SSID. A Probe Request frame having a broadcast SSID causes all access points (e.g., the network device 116, the access point 204 (FIG. 2), the access point 305 (FIG. 3), and the access point 405 (FIG. 4), etc . . . ) to respond with a Probe Response frame. Its purpose is to stop other wireless equipment accessing the LAN—whether accidentally or intentionally. To communicate with the access point (AP), WLAN devices must be configured with the same SSID. If the 'Allow broadcast of SSID' command is unselected in a router or access point, the SSID of that device will not be visible in the other device's site survey, and, if a device wants to become associated with the router or access point the SSID must be entered manually.

The Extended Service Set Identification (ESSID) is one of two types of Service Set Identification (SSID) parameters. An ad-hoc wireless network with no access points uses the Basic Service Set Identification (BSSID). In an infrastructure wireless network that includes an access point (e.g., the network device 116, the access point 204 (FIG. 2), the access point 305 (FIG. 3), and the access point 405 (FIG. 4), etc . . . ), the Extended Service Set Identification (ESSID) is used—although it may still be referred to as SSID. IEEE 802.11 standard. WLANs periodically broadcast or announce the identifier of the network. This is done by means of the beacon frame, typically each 100 ms. The beacon frame broadcasts some or all of the following information (about 40 bytes): MAC address of the router; Name of the network (32 bytes maximum for SSID); Time; Periodicity of the beacon; Information bits that define the network type (ad-hoc, infrastructure . . . ); and other parameters.

Dual SSID transmission allows the creation of simultaneous WLANs from the same access point (e.g., the network device 116, the access point 204 (FIG. 2), the access point 305 (FIG. 3), and the access point 405 (FIG. 4), etc . . . ). In the case of dual SSID, two beacon frames can be sent every 100 ms. Dual SSID broadcasting allows creating two networks with one same access point or router, which can be termed virtual local area networks (VLAN). For example, one network can be reserved for public, and the other network can be reserved for private use. Dual or Multiple SSID transmissions can share the same frequency channel and medium capacity. There are also devices that include a WLAN switch. The WLAN switch provides an independent connectivity to each of the VLAN, with different security requirements.

Access points (e.g., the network device 116, the access point 204 (FIG. 2), the access point 305 (FIG. 3), and the access point 405 (FIG. 4), etc . . . ) can be configured with dual frequency band transceivers, which allow dual channel WLAN transmission, each one with one or more different SSID. For example, one transceiver in the 2.4 GHz band and the other transceiver in the 5 GHz band. In some instances, the dual frequency transceivers can be in the same frequency band, the 5 GHz band, allowing dual transmissions in the 5 GHz band. Dual band can support the 802.11a and 802.11n standards in the 5 GHz band and standards 802.11b, 802.11g, and 802.11n in the 2.4 GHz legacy band. Unlike access points that only supports one signal band, dual-band access points contains two different types of wireless transceivers that can support connections with both 2.4 GHz and 5 GHz links. The two bands can be used as independent transmission communication channels, not allowing the transfer of information and communications data from one to another.

The user device 102 can determine whether a token is stored on the user device 102. If the user device 102 has a stored token, the user device 102 can transmit the token with a request for network credentials for the first network to the computing device 104 via the second network. The computing device 104 can use the token processor 120 to determine if the received token is valid, and if so, determine user account information and associated network credentials using an identifier obtained from the token. In an aspect, the computing device 104 will unencrypt the token to determine the identifier. The token can further comprise an identification of a user and/or the user device 102 and in some aspects, can comprise an identification of specific networks/network devices. The computing device 104 can transmit the network credentials 122 stored in the database 104 to the user device 102 via the second network. The user device 102 can disconnect from the second network and use the new network credentials to access the first network via the beacon 124.

If the user device 102 does not have a stored token, the user device 102 can transmit a request for a token to the computing device 104 via the second network. The request can comprise the device identifier 108, the address element 110, the service element 112, user account login information, combinations thereof, and the like. The computing device 104 can use the token processor 120 to determine if the request is from an authorized user/user device and, if so, generate a token and transmit the token to the user device 102 via the second network. The user device 102 can then use the token as described above to request network credentials for accessing the first network.

Figure 2:
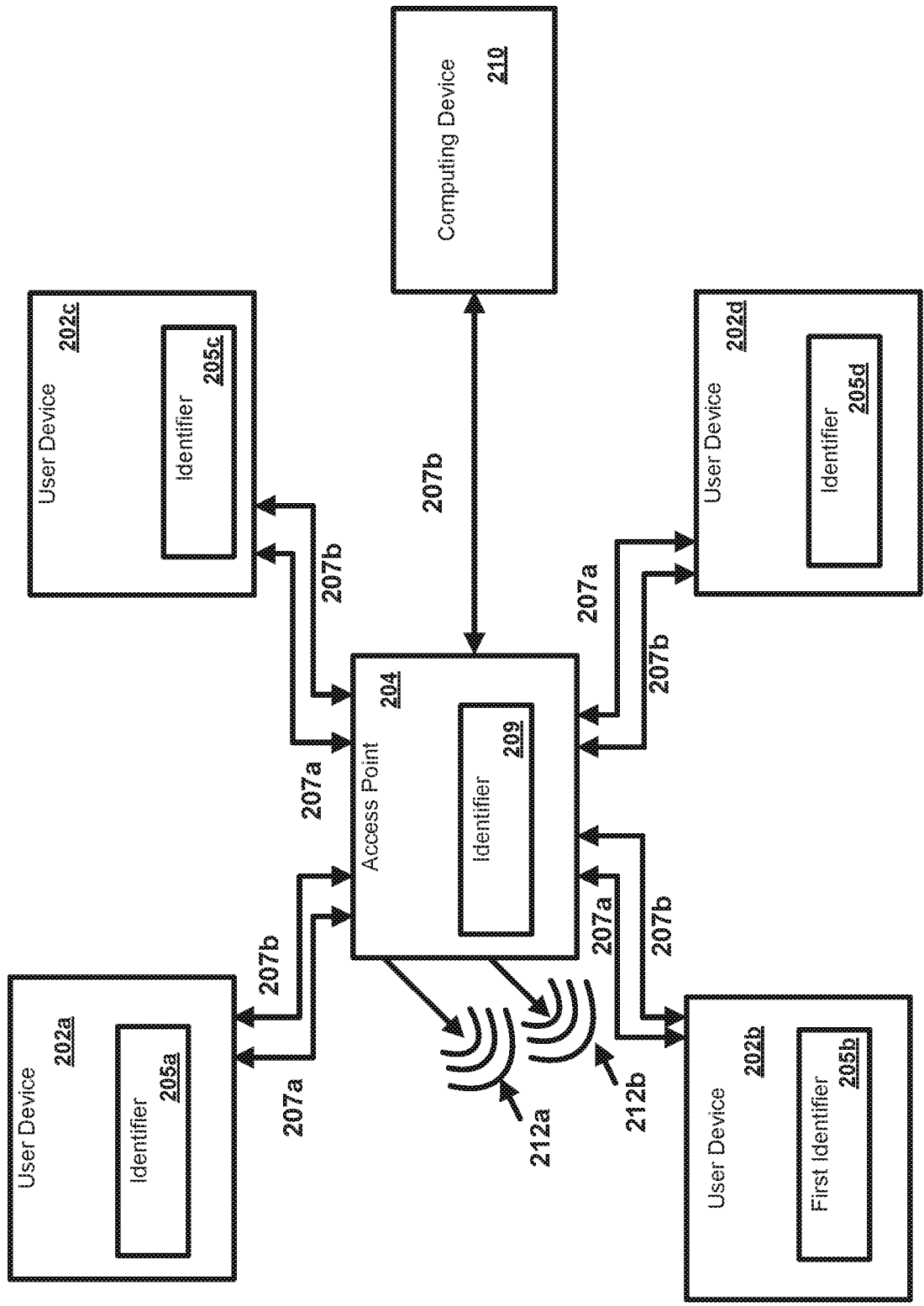
FIG. 2 is a block diagram of another exemplary system.

FIG. 2 illustrates an exemplary system and network. In an aspect, a plurality of user devices 202a, 202b, 202c, 202d can be in communication with an access point 204. As an example, one or more user devices 202a, 202b, 202c, 202d can be a computing device, a communication device, a computer, a smartphone, a laptop, a tablet, a set top box, a display device, or other device capable of communicating with one or more of the user devices 202a, 202b, 202c, 202d of the network.

In an aspect, the user devices 202a, 202b, 202c, 202d can be associated with user identifiers or device identifiers 205a, 205b, 205c, 205d. As an example, the device identifiers 205a, 205b, 205c, 205d can be any identifier, token, character, string, or the like, for differentiating one user or user device (e.g., user device 202a) from another user or user device. In a further aspect, the device identifiers 205a, 205b, 205c, 205d can identify a user or user device as belonging to a particular class of users or user devices. As a further example, the device identifiers 205a, 205b, 205c, 205d can comprise information relating to the user device, such as a manufacturer, a model or type of device, a service provider associated with the user devices 202a, 202b, 202c, 202d, a state of the user devices 202a, 202b, 202c, 202d, a locator, and/or a label or classifier. Other information can be represented by the device identifiers 205a, 205b, 205c, 205d. In an aspect, the identifiers 205a, 205b, 205c, 205d can be an internet protocol address, a MAC address, a network address, an Internet address, or the like. As an example, the identifiers 205a, 205b, 205c, 205d can be relied upon to establish a communication session between the user devices 202a, 202b, 202c, 202d and the computing device 210 or other devices (e.g., access point 204) and/or networks. As a further example, the identifiers 205a, 205b, 205c, 205d can be used as an identifier or locator of the user devices 202a, 202b, 202c, 202d, In an aspect, the identifiers 205a, 205b, 205c, 205d can be persistent for a particular network and/or location.

In an aspect, the user devices 202a, 202b, 202c, 202d can be configured as a network, such as a mesh network. As an example, the access point 204 and/or one or more user devices 202a, 202b, 202c, 202d can comprise a dual band wireless network device. As an example, a first network 207a or service can be provided. The first network 207a can be configured with a first service set identifier (SSID) (e.g., associated with a user network or private network) to function as a local network for a particular user or users. As a further example, a second network 207b or service can be provided.

The first network 207a and the second network 207b can be associated with and/or a part of a single physical network, such as a local area network and/or a wide area network. For example, the first network 207a and the second network 207b can be two independent wireless networks created by, supported by, and/or associated with a single access point (e.g., an access point that supports multiple SSIDs, an access point with multiple transceivers, the network device 116, the access point 204, the access point 305 (FIG. 3), the access point 405 (FIG. 4), etc . . . ). The first network 207a and the second network 207b can be different physical signaling sublayers of a physical network. For example, the first network 207a and the second network 207b can be associated with different channels of a physical layer component (e.g., coaxial cable, T1 cable T3 cable, Ethernet, fiber, etc . . . ). The second network 207b can be configured to provide less functionality than the first network 207a. For example, the second network 207b can be configured to provide only a provisioning function to enable a user device (e.g., the user devices 202a, 202b, 202c, 202d) to connect to the first network 207a. The second network 207b can be a subnetwork of the first network 207a, The first network 207a can be a subnetwork of the second network 207k The first network 207a and the second network 207b can be subnetworks of a third network (not shown), The first network 207a and the second network 207b can be networks within and/or associated with the third network (not shown). The first network 207a and the second network 207b can be part of a single network (e.g., the third network) within which the second network 207b can be configured to provide less functionality than the first network 207a. For example, the second network 207b can be configured to provide only a provisioning function to enable a user device to connect to the first network 207a. The second network 207b can be configured with a second service set identifier (SSID) (e.g., associated with a public/community network, a hidden network, or a limited services (e.g., provisioning) network) to function as a secondary network or redundant network for connected communication devices.

In an aspect, one or more of the user devices 202a, 202b, 202c, 202d can comprise an identifier 205a, 205b, 205c, 205d. As an example, one or more identifiers can be a media access control address (MAC address). Any uniquely identifiable attribute that can be linked to a location can be used as the identifier 205a, 205b, 205c, 205d. Such attributes can comprise one or more of an IP Address, serial number, latitude/longitude, neo-encoding, custom assigned unique identifier, global unique identifier (GUID), and the like. As a further example, one or more identifiers 205a, 205b, 205c, 205d can be a unique identifier for facilitating communications on the physical network segment. In an aspect, each of the user devices 202a, 202b, 202c, 202d can comprise a distinct identifier 205a, 205b, 205c, 205d. As an example, the identifiers 205a, 205b, 205c, 205d can be associated with a physical location of the user devices 202a, 202b, 202c, 202d.

In an aspect, one or more user devices 202a, 202b, 202c, 202d can be in communication with the access point 204. As an example, one or more user devices 202a, 202b, 202c, 202d and/or the access point 204 can be configured to allow one or more wireless devices to connect to a wired and/or wireless network using Bluetooth or similar standard. The access point 204 can comprise an identifier 209. As an example, one or more identifiers 209 can be a media access control address (MAC address). As a further example, one or more identifiers 209 can be a unique identifier for facilitating communications on the physical network segment.

In an aspect, a computing device 210 can be in communication with a network device, such as access point 204. As an example, the computing device 210 can be or comprise an application server, management device, auto-configuration server (ACS), AAA server, provisioning server, etc. In another aspect, the computing device 210 is located within the second network, such as a wide area network (WAN).

In an aspect, the user devices 202a, 202b, 202c, 202d can connect to a first network via a network device, such as access point 204. As an example, the user devices 202a, 202b, 202c, 202d can discover one or more beacons 212a, 212b transmitted (e.g., wirelessly) by the access point 204. The one or more beacons 212a, 212b can comprise information to facilitate a connection between the user devices 202a, 202b, 202c, 202d and the access point 204. The one or more beacons 212a, 212b can comprise or relate to one or more SSIDs. As an example, a first beacon 212a can be associated with a first SSID and/or a first service (e.g., the first network 207a). As another example, a second beacon 212b can be associated with a second SSID and/or a second service (e.g., the second network 207b).

In an aspect, the one or more beacons 212a, 212b and/or an SSID can be transmitted over one or more channels or frequency bands. The user devices 202a, 202b, 202c, 202d can be configured to support 2.4 GHZ and 5 GHZ bands for Wi-Fi. Within the 2.4 GHz band, multiple channels (e.g., channels 1-11 (in the United States) and 1-14 (outside the United States) can be used. The 2.4 GHz band can comprise 2412 Mhz-2484 Mhz. The 5 Ghz band can comprise one or more channels governed by many possible regulations between channel 7 and 196, for example, between 4915 Mhz and 5825 Mhz. Any number of channels where regulations allow can be used to broadcast a beacon (e.g., one or more beacons 212a, 212b) and transmit data.

In an aspect, the user devices 202a, 202b, 202c, 202d might not be able to access one or more networks or services that the user devices 202a, 202b, 202c, 202d have accessed previously and/or are otherwise authorized to access. For example, network credentials necessary to access the access point 204 may have changed since the access point was previously accessed. For example, an SSID for the network 207a may have changed, or a password associated with the network 207a may have changed. However, the user devices 202a, 202b, 202c, 202d can still connect to the access point 204 by using the second beacon 212b as an alternative to the first beacon 212a. For example, the access point 204 can facilitate communication between the user devices 202a, 202b, 202c, 202d and the computing device 210 via the second beacon 212b (e.g., the second network 207b). In aspect, the access point 204 can continuously make the second beacon 212b available or can make the second beacon 212b available only when a change has been made to a network credential for the first network 207a. Such operation can enable the user devices 202a, 202b, 202c, 202d to communicate with the computing device 210 to obtain data, information, and/or configurations associated with the first beacon 212a (e.g., request a token, receive network credentials such as a changed or new SSID and/or a password) as described in FIG. 1. Such operation can be repeated for one or more devices 202a, 202b, 202c, 202d.

Figure 3:
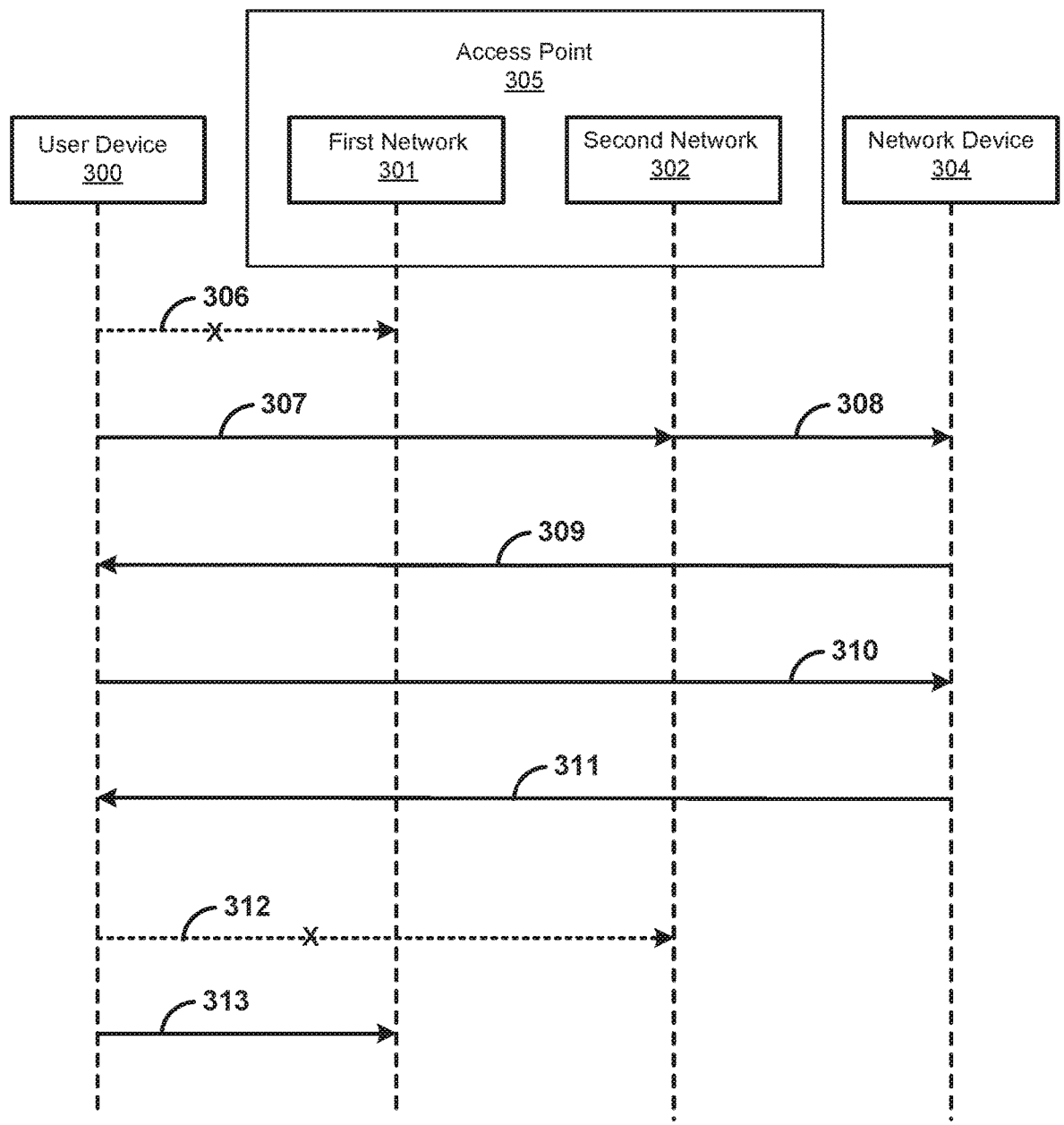
FIG. 3 illustrates a data flow for connecting a device to a wireless network.

FIG. 3 shows a data flow for a user device 300 failing to connect to a first network 301 when a token associated with the first network 301 is not stored by the user device 300. Further, FIG. 3 shows a data flow for a user device 300 connecting to a second network 302 (e.g., the second network 207b) via an access point 304 to obtain configuration information (e.g., network credentials) that will enable the user device 300 to connect to the first network 301. The access point 304 can broadcast a wireless network according to an IEEE 802.11 standard, an IEEE 802.15 standard, or any other wireless broadcast standard.

The user device 300 (e.g., user device 202a) determine a failure to connect to a first network 301 (e.g., the first network 207a) associated with a first SSID broadcast by an access point 304 (e.g., the access point 204) at 305. In an aspect, the failure to connect to the first network 301 by the user device 300 can be based on a changed SSID or new SSID being configured for the first time and the user device 300 not being configured to connect to the first network 301 via the changed SSID or new SSID. In an aspect, a new SSID can describe a SSID that is used for a newly configured network for which no previous SSID exists. A changed SSID can describe an SSID associated with a network that has been updated or modified. Based on the determined failure to connect to the first network 301, the user device 300 can connect to a second network 302 (e.g., second network 207b) associated with a second SSID broadcast by the access point 304 at 306. The second SSID can be static. In other words, the second SSID is not changed frequently, if at all. The second network 302 can be a secure network but with limited functionality. For example, the second network 302 can be limited to providing a communications link between the user device 300 and the remote computing device 303 (e.g., a network device, communication device 210, a provisioning server, etc.) for the purposes of updating the user device 300 to be able to connect to the first network 301.

The access point 304 can facilitate a connection between the user device 300 and a remote computing device 303 (e.g., communication device 210, provisioning server, etc.) at 307. In an aspect, the connection between the user device 300 and the remote computing device 303 can be a secure connection. The connection between the user device 300 and the remote computing device 303 can be protected using security protocols, such as Wired Equivalent Privacy (WEP), Wi-Fi Protected Access (WPA), WPA2, and/or the like.

When a secure connection between the user device 300 and the remote computing device 303 is established, the user device 300 can be provisioned for accessing the first network 301 using an identifier associated with the user device 300 (e.g., identifier 205) by associating the identifier of the user device 300 with a given user account. Alternatively, a user of the user device 300 may be prompted for login information associated with a user account (e.g., a userid, a password, an account, a phone number, etc.) that uniquely associates the user device 300 to the user account. The user account can be associated with the first network 301.

When the user device 300 is successfully associated with a user account and/or is successfully associated with the first network 301, the remote computing device 303 can provide the user device 300 with a token by transmitting the token to the user device 300 at 308. The token can uniquely associate the user device 300 with a given user account and further associate the user device 300 with the first network 301. The token can be stored, saved, and/or otherwise persisted at the user device 300. When the user device 300 has a token (e.g., the token has recently been provided by the remote computing device 303, the token is already stored/persisted at the user device 300, etc.) the user device 300 can transmit the token to the remote computing device 303 and the remote computing device 303 can validate (e.g., approve, accept, authorize, etc.) the token at 309. Alternatively, the remote computing device 303 can revoke, deny, or otherwise reject the token by determining that the token is invalid and designating the token as invalid, thus terminating any further attempt by the user device 300 to connect to the first network 301.

When the remote computing device 303 validates the token, the remote computing device 303 can determine the user account associated with the user device 300 and the access point 304 used by the user device 300 to connect to the remote computing device 303. Based on the determination of the associated user account and access point 304, the remote computing device 303 can provide (e.g., transmit) a network credential to the user device 300 at 310. In an aspect, the network credential can comprise SSID (e.g., changed SSID or new SSID) and security (e.g., password, security element, etc.) information associated with the first network 301.

When the user device 300 receives the network credential, the network credential can be used by the user device 300 to connect to the first network 301. The user device 300 can disconnect from the second network 302 associated with the second SSID at 311. When the user device 300 disconnects from the second network 302, the user device 300 can connect to the first network 301 based on the network credential at 312. The user device 300 can remain connected to the first network 301 as long as the information associated with the first network 301 and comprised in the network credential remains unchanged. In an aspect, the user device 300 can connect to the first network 301 prior to disconnecting from the second network 302.

Figure 4:
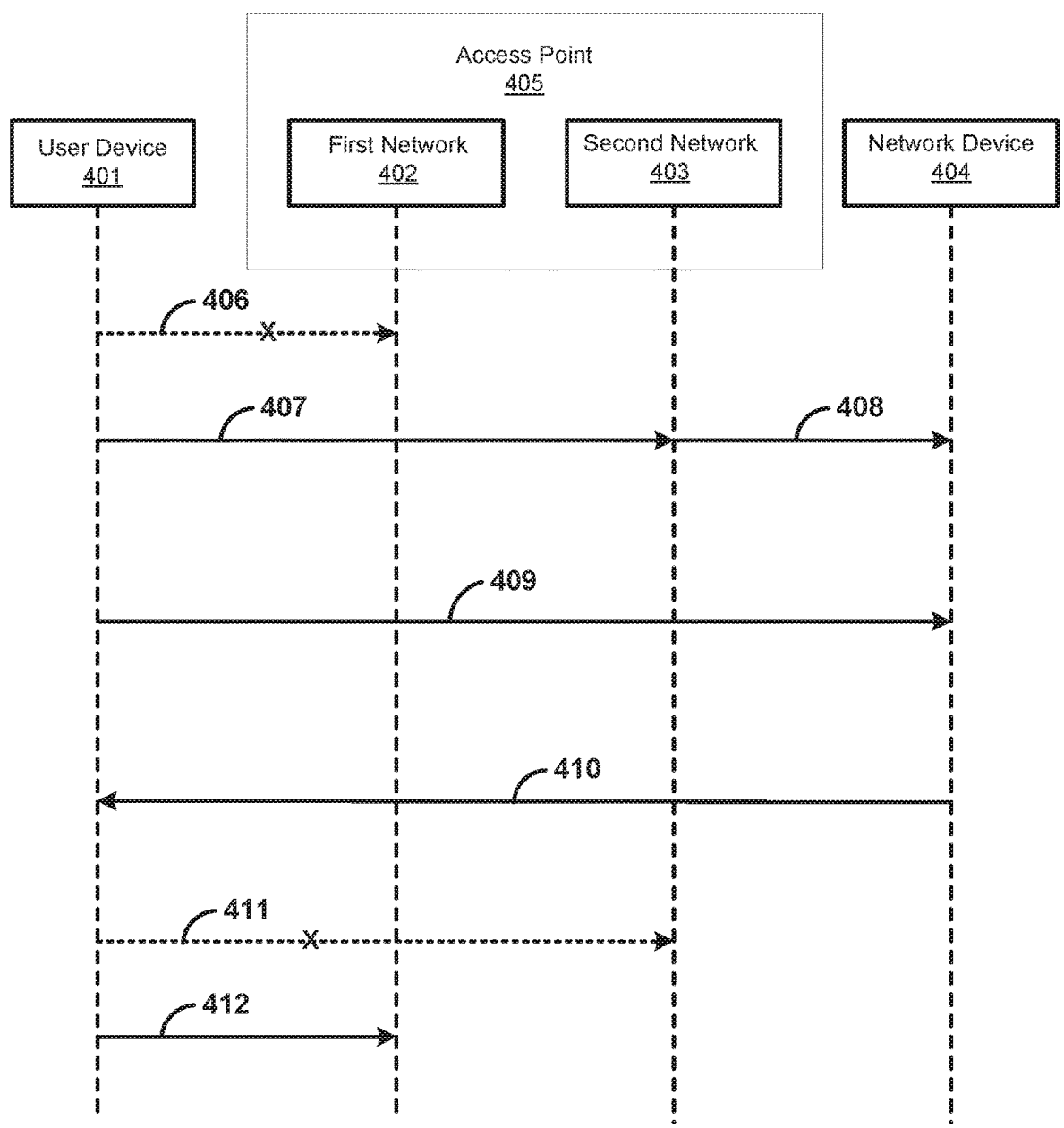
FIG. 4 illustrates a data flow for connecting a device to a wireless network.

FIG. 4 shows a data flow for a user device 400 failing to connect to a first network 401 when a token associated with the first network 401 is stored by the user device 400. Further, FIG. 4 shows a data flow for a user device 400 connecting to a second network 402 (e.g., the second network 207b) via an access point 404 to validate a token that can enable the user device 400 to connect to the first network 401, and connecting to the first network 401. The access point 404 can broadcast a wireless network according to an IEEE 802.11 standard, an IEEE 802.15 standard, or any other wireless broadcast standard.

A user device (e.g., the user device 202a) can determine a failure to connect to a first network 401 (e.g., the first network 207a) associated with a first SSID broadcast by an access point 404 (e.g., the access point 204) at 405. In an aspect, the failure to connect the user device 400 to the first network 401 can be based on a changed SSID or new SSID and the user device 400 not being configured to connect to the first network 401 via the changed SSID or new SSID. In an aspect, a new SSID can describe an SSID that is used for a newly configured network for which no previous SSID exists. A changed SSID can describe an SSID associated with a network that has been updated or modified. Based on the determined failure to connect to the first network 401, the user device 400 can connect to a second network 402 (e.g., the second network 207b) associated with a second SSID broadcast by the access point 404 at 406. The access point 404 can facilitate a connection between the user device 400 and a remote computing device 403 (e.g., communication device 210, a provisioning server, etc.) at 407. In an aspect, the connection between the user device 400 and the remote computing device 403 can be a secure connection. The connection between the user device 400 and the remote computing device 403 can be protected using security protocols, such as Wired Equivalent Privacy (WEP), Wi-Fi Protected Access (WPA), WPA2, and/or the like.

When a secure connection between the user device 400 and the remote computing device 403 is established, the user device 400 can transmit the token to the remote computing device 403 and the remote computing device 403 can validate (e.g., approve, accept, authorize, etc.) the token at 408. Alternatively, the remote computing device 403 can revoke, deny, or otherwise reject the token by determining that the token is invalid and designating the token as invalid, thus terminating any further attempt by the user device 400 to connect to the first network 401.

When the remote computing device 403 validates the token, the remote computing device 403 can determine the user account associated with the user device 400 and the access point 404 used by the user device 400 to connect to the remote computing device 403. Based on the determination of the associated user account and access point 404, the remote computing device 403 can provide (e.g., transmit) a network credential to the user device 400 at 409. In an aspect, the network credential can comprise SSID (e.g., changed SSID or new SSID) and security (e.g., password, security element, etc.) information associated with the first network 401.

When the user device 400 receives the network credential, the network credential can be used by the user device 400 to connect to the first network 401. The user device 400 can disconnect from the second network 402 associated with the second SSID at 410. When the user device 400 disconnects from the second network 402, the user device 400 can connect to the first network 401 based on the network credential at 411. The user device 400 can remain connected to the first network 401 as long as the information associated with the first network 401 and comprised in the network credential remains unchanged. In an aspect, the user device 400 can connect to the first network 401 prior to disconnecting from the second network 402.

FIG. 5 is a flowchart illustrating an example method 500. In step 502 a computing device (e.g., the user device 202a) can determine a failed attempt to connect to a first network (e.g., first network 207a) via a first identifier (e.g., first SSID) through an access point (e.g., access point 204). The failure to connect can be based on a configuration associated with the first network. The configuration associated with the first network can comprise an updated identifier, a new identifier, an updated security element (e.g., password), a new security element associated with the first network, combinations thereof, and the like. In an aspect, the first network can comprise a wireless network (e.g., a network operating according to the IEEE 802.11 standard, the IEEE 802.15 standard, and/or any other wireless broadcast standards). In an aspect, the first network can comprise a local network configured to facilitate communication among communication devices (e.g., user devices) present inside or within the close vicinity of a premises. The first network can be maintained and accessed by a specific subscriber. The first network can comprise a network protected using Wired Equivalent Privacy (WEP), Wi-Fi Protected Access (e.g., WPA2), or other similar security protocols. In an aspect, the first network can be a portion of, associated with, and/or within another network (e.g., network 105). Further, the first network can comprise and/or be associated with a second network (e.g., a subnetwork). The first network and the second network can be associated with and/or a part of a single physical network, such as a local area network and/or a wide area network. For example, the first network and the second network can be two wireless networks created by, supported by, and/or associated with a single access point (e.g., an access point that supports multiple SSIDs, an access point with multiple transceivers, the network device 116, the access point 204 (FIG. 2), the access point 305 (FIG. 3), the access point 405 (FIG. 4), etc. . . . ). The first network and the second network can be associated with and/or a part of a single physical network, such as a local area network and/or a wide area network, for example. The first network and the second network can be different physical signaling sublayers of a physical network. For example, the first network and the second network can be associated with different channels of a physical layer component (e.g., coaxial cable, T1 cable T3 cable, Ethernet, fiber, etc . . . ). The second network can be configured to provide less functionality than the first network. For example, the second network can be configured to provide only a provisioning function to enable a user device (e.g., the user device 102, the user devices 202a, 202b, 202c, 202d, the user device 300, the user device 400) to connect to the first network.

In step 504, the computing device can connect to the second network (e.g., second network 207b) via a second identifier (e.g., second SSID) broadcast by the access point. In an aspect, the second network can be a portion of, associated with, and/or within another network (e.g., the first network, network 105, etc . . . ). In an aspect, the second network can comprise a wireless network (e.g., a network operating according to the IEEE 802.11 standard, the IEEE 802.15 standard, and/or any other wireless broadcast standards). In an aspect, the second network can comprise a limited services network, such as a network designated to only provide service provisioning (e.g., provisioning Wi-Fi parameters and/or credentials). In an aspect, the second network can be configured to provide a secure connection for service provisioning. For example, the second network can comprise a network protected using Wired Equivalent Privacy (WEP), Wi-Fi Protected Access (e.g., WPA2), or other similar security protocols. The computing device can be configured such that the computing device can automatically connect to a network associated with a second SSID whenever the first network is unreachable, unavailable, and/or the like.

In step 506, the computing device can determine that a token is not available. In an aspect, the token can comprise data that can associate the computing device to the first network, to a user, to a user account, combinations thereof, and the like. In an aspect, the token can comprise information indicating the computing device is associated with the first network and authorized to connect to the first network. In another aspect, the computing device determining that a token is not available can comprise determining that the token is not stored by the computing device.

In step 508, the computing device can transmit to a remote computing device (e.g., computing device 210, provisioning device, etc.) via the second network, a request for a token. In an aspect, the request for a token can comprise information that associates the computing device to the first network to a user, to a user account, combinations thereof, and the like. For example, the request can comprise a userid, a password, an account, a phone number, etc. In another example, in response to the request, the remote computing device can require user credentials be received from the computing device. The user credentials can comprise a userid, a password, an account, a phone number, etc. The remote computing device can generate the token based on the request (e.g., confirming that an authorized userid and/or password were provided).

In step 510, the computing device can receive the token from the remote computing device. In an aspect, when the token is received by the computing device from the remote computing device, the token can be stored, saved, or otherwise persisted by the computing device. For example, the token can be stored in memory by the computing device. In an aspect, the token can be stored by the computing device either temporarily or permanently.

In step 512, the computing device can then transmit the token back to the remote computing device for validation. In an aspect, validating the token can comprise associating the token with the computing device, the first network, a user, a user account, combinations thereof, and the like. Additionally, validating the token can comprise verifying that the token is transmitted by a proper authority (e.g., the computing device), and/or verify that the token is in proper form (e.g., proper data structure, proper format, properly encoded, not expired, not used more than a threshold number of times, etc). In another aspect, validating the token can comprise verifying that data/information comprised in the token correlates to data/information stored by the remote computing device. Further, validating the token can comprise the remote computing device determining whether the token has been previously revoked, marked invalid, or otherwise rejected.

In step 514, after the token is validated by the remote computing device, the computing device can receive, from the remote computing device, a network credential associated with the first network. In an aspect, the network credential can comprise identifier information (e.g., SSID) and security information. For example, the network credential can comprise an updated identifier, a new identifier, an updated security element (e.g., password), a new security element, combinations thereof, and the like, associated with the first network. As a further example, if the first SSID associated with the first network is initialized for the first time or changed (e.g., a user selects a new SSID and/or password for the first network, or a user changes the SSID and/or password associated with the first network), the network credential can comprise details associated with the new SSID or changed SSID as well as any associated security elements, such as a password. The network credential can automatically be stored by the remote computing device.

In step 516, in response to the computing device receiving the network credential, the computing device can connect to the first network based on the network credential. For example, the computing device can connect to the first network based on the identifier and security element FIG. 6 is a flowchart illustrating an example method 600. In step 602 a computing device (e.g., the user device 202a) can determine a failed attempt to connect to a first network (e.g., first network 207a) via a first identifier (e.g., first SSID) through an access point (e.g., access point 204). The failure to connect can be based on a configuration associated with the first network. The configuration associated with the first network can comprise an updated identifier, a new identifier, an updated security element (e.g., password), a new security element, combinations thereof, and the like, associated with the first network. In an aspect, the first network can comprise a wireless network. For example, the first network can comprise a wireless network (e.g., a network operating according to the IEEE 802.11 standard, the IEEE 802.15 standard, and/or any other wireless broadcast standards). In an aspect, the first network can comprise a local network configured to facilitate communication among communication devices (e.g., user devices) present inside or within the close vicinity of a premises. The first network can be maintained and accessed by a specific subscriber. For example, the first network can comprise a network protected using Wired Equivalent Privacy (WEP), Wi-Fi Protected Access (e.g., WPA2), or other similar security protocols. In an aspect, the first network can be a portion of, associated with, and/or within another network (e.g., network 105). Further, the first network can comprise and/or be associated with a second network (e.g., a subnetwork). The first network and the second network can be associated with and/or a part of a single physical network, such as a local area network and/or a wide area network. For example, the first network and the second network can be two wireless networks created by, supported by, and/or associated with a single access point (e.g., an access point that supports multiple SSIDs, an access point with multiple transceivers, the network device 116, the access point 204 (FIG. 2), the access point 305 (FIG. 3), the access point 405 (FIG. 4), etc . . . ). The first network and the second network can be associated with and/or a part of a single physical network, such as a local area network and/or a wide area network, for example. The first network and the second network can be different physical signaling sublayers of a physical network. For example, the first network and the second network can be associated with different channels of a physical layer component (e.g., coaxial cable, T1 cable T3 cable, Ethernet, fiber, etc . . . ). The second network can be configured to provide less functionality than the first network. For example, the second network can be configured to provide only a provisioning function to enable a user device (e.g., the user device 102, the user devices 202a, 202b, 202c, 202d, the user device 300, the user device 400) to connect to the first network.

In step 604, the computing device can connect to the second network (e.g., second network 207b) via a second identifier (e.g., second SSID) broadcast by the access point. In an aspect, the second network can be a portion of, associated with, and/or within another network (e.g., the first network, network 105, etc . . . ). In an aspect, the second network can comprise a wireless network. For example, the second network can comprise a wireless network (e.g., a network operating according to the IEEE 802.11 standard, the IEEE 802.15 standard, and/or any other wireless broadcast standards). In an aspect, the second network can comprise a limited services network, such as a network designated to only provide service provisioning and Wi-Fi credential. In an aspect, the second network can be configured to provide a secure connection for service provisioning. For example, the second network can comprise a network protected using Wired Equivalent Privacy (WEP), Wi-Fi Protected Access (e.g., WPA2), or other similar security protocols. For example, the user device can be configured such that the user device can automatically connect to a network associated with a second SSID whenever the first network is unreachable, unavailable, and/or the like.

In step 606, the computing device can determine that a token is available. In an aspect, the token can associate the computing device to the first network, to a user, to a user account, combinations thereof, and the like. In an aspect, the token can comprise information indicating the computing device is associated with the first network and authorized to connect to the first network. In another aspect, the computing device determining that a token is available can comprise determining that the token is stored by the computing device.

In step 608, the computing device can transmit the token to the network device for validation. In an aspect, validating the token can comprise associating the token with the computing device, the first network, a user, a user account, combinations thereof, and the like. Additionally, validating the token can comprise verifying that the token is transmitted by a proper authority (e.g., the computing device), and/or verify that the token is in proper form (e.g., proper data structure, proper format, properly encoded, not expired, not used more than a threshold number of times, etc.). In another aspect, validating the token can comprise verifying that data/information comprised in the token correlates to data/information stored by the remote computing device. Further, validating the token can comprise the remote computing device determining whether the token has been previously revoked, marked invalid, or otherwise rejected.

In step 610, after the token is validated by the network device, the computing device can receive, from the network device, a network credential associated with the first network. In an aspect, the network credential can comprise identifier information (e.g., SSID) and security information. For example, the network credential can comprise an updated identifier, a new identifier, an updated security element (e.g., password), a new security element, combinations thereof, and the like, associated with the first network. As a further example, if the first SSID associated with the first network is initialized for the first time or changed (e.g. a user selects a new SSID and/or password for the first network, or a user changes the SSID and/or password associated with the first network) the details associated with the new SSID or changed SSID as well as any associated security elements, such as a password, can be comprised in the network credential. The network credential can automatically be stored by the network device.

In step 612, in response to the computing device receiving the network credential, the computing device can connect to the first network based on the network credential. For example, the computing device can connect to the first network based on the identifier and security element comprised in the network credential.

FIG. 7 is a flowchart illustrating an example method 700. In step 702 a remote computing device (e.g., computing device 210, provisioning device) can receive, from a computing device (e.g., user device 202a) a request for a token. A token can comprise information indicating the computing device is associated with a first network (e.g., first network 207a) and authorized to connect to the first network. In an aspect, the request for a token can comprise information that associates the computing device to a first network, to a user, to a user account, combinations thereof, and the like. For example, the request can comprise a userid, a password, an account, a phone number, etc. In another example, in response to the request, the network device can require user credentials be received from the computing device. The user credentials can comprise a userid, a password, an account, a phone number, etc.

In another aspect, the network device receiving, from the computing device, the request for a token can be based on a failed attempt by the computing device to connect to the first network via a first identifier (e.g., first SSID) through an access point (e.g., access point 204). The failure to connect can be based on a configuration associated with the first network. The configuration associated with the first network can comprise an updated identifier, a new identifier, an updated security element (e.g., password), and a new security element associated with the first network. In an aspect, the first network can comprise a wireless network. For example, the first network can comprise a wireless network (e.g., a network operating according to the IEEE 802.11 standard, the IEEE 802.15 standard, and/or any other wireless broadcast standards). In an aspect, the first network can comprise a first network, such as a home network (e.g., a local network) configured to facilitate communication among communication devices (e.g., user devices) present inside or within the close vicinity of a home. The first network can be maintained and accessed by a specific subscriber. For example, the first network can comprise a network protected using Wired Equivalent Privacy (WEP), Wi-Fi Protected Access (e.g., WPA2), or other similar security protocols. In an aspect, the first network can be a portion of, associated with, and/or within another network (e.g., network 105). Further, the first network can comprise and/or be associated with a second network (e.g., a subnetwork). The first network and the second network can be associated with and/or a part of a single physical network, such as a local area network and/or a wide area network. For example, the first network and the second network can be two wireless networks created by, supported by, and/or associated with a single access point (e.g., an access point that supports multiple SSMs, an access point with multiple transceivers, the network device 116, the access point 204 (FIG. 2), the access point 305 (FIG. 3), the access point 405 (FIG. 4), etc . . . ). The first network and the second network can be associated with and/or a part of a single physical network, such as a local area network and/or a wide area network, for example. The first network and the second network can be different physical signaling sublayers of a physical network. For example, the first network and the second network can be associated with different channels of a physical layer component (e.g., coaxial cable, T1 cable T3 cable, Ethernet, fiber, etc . . . ). The second network can be configured to provide less functionality than the first network. For example, the second network can be configured to provide only a provisioning function to enable a user device (e.g., the user device 102, the user devices 202a, 202b, 202c, 202d, the user device 300, the user device 400) to connect to the first network.

In an aspect, the network device can be associated with the second network. In an aspect, the second network can be a portion of, associated with, and/or within another network (e.g., the first network, network 105, etc . . . ). The second network can comprise a wireless network. For example, the second network can comprise a wireless network (e.g., a network operating according to the IEEE 802.11 standard, the IEEE 802.15 standard, and/or any other wireless broadcast standards). In an aspect, the second network can comprise a limited services network, such as a network designated to only provide service provisioning and Wi-Fi credential. In an aspect, the second network can be configured to provide a secure connection for service provisioning. For example, the second network can comprise a network protected using Wired Equivalent Privacy (WEP), Wi-Fi Protected Access (e.g., WPA2), or other similar security protocols. For example, the user device can be configured such that the user device can automatically connect to a network associated with a second SSID whenever the first network is unreachable, unavailable, and/or the like.

In step 704, the network device can determine that the computing device is associated with an account authorized to access the first network. In an aspect, determining that the computing device is associated with an account authorized to access the first network can comprise verifying information that associates the computing device to the first network. For example, the request for a token can comprise a userid, a password, an account, a phone number, etc. that associated the computing device to the first network. In another example, determining that the computing device is associated with an account authorized to access the first network can comprise the network device requiring user credentials be received from the computing device. The user credentials can comprise a userid, a password, an account, a phone number, etc.

In step 706, based on the determination that the computing device is associated with an account authorized to access the first network, the network device can generate and transmit a token to the computing device. In an aspect, the token may be generated in response to a request received from the user device 102. A token may be generated in response to creation of a user account and/or storage of user account information in the database 114. In an aspect, a user may request a new token to be generated and also at the same time identify the data that is to be shared using the token (e.g., identify one or more networks for which network credentials should be shared). In an aspect, generating the token can comprise generating an identifier. The identifier can be used to associate the token with the user account information. For example, the identifier can comprise an identifier contained with the user account information, such as an e-mail address, a username, a user number, and the like. In a further aspect, generating the token can comprise generating an encryption key. The encryption key can be the same encryption key used to encrypt user account information associated with the user requesting the token.

In step 708, the network device can receive, from the computing device, a request to validate the token. In step 710, the network device can validate the token. In an aspect, validating the token can comprise associating the token with the computing device and/or the first network. In an aspect, validating the token can comprise associating the token with the computing device, the first network, a user, a user account, combinations thereof, and the like. Additionally, validating the token can comprise verifying that the token is transmitted by a proper authority (e.g., the computing device), and/or verify that the token is in proper form (e.g., proper data structure, proper format, properly encoded, not expired, not used more than a threshold number of times, etc.). In another aspect, validating the token can comprise verifying that data/information comprised in the token correlates to data/information stored by the remote computing device. Further, validating the token can comprise the remote computing device determining whether the token has been previously revoked, marked invalid, or otherwise rejected.

In step 712, in response to the token being validated, the network device can transmit, to the computing device, a network credential associated with the first network. In an aspect, the network credential can comprise identifier information (e.g., SSID) and security information. For example, the network credential can comprise an updated identifier, a new identifier, an updated security element (e.g., password), and a new security element associated with the first network. As a further example, if the first SSID associated with the first network is initialized for the first time or changed (e.g. a user selects a new SSID and/or password for the first network, or a user changes the SSID and/or password associated with the first network) the details associated with the new SSID or changed SSID as well as any associated security elements, such as a password, can be comprised in the network credential. The network credential can automatically be stored by the network device. The network credential associated with the first network can enable the computing device to connect to the first network based on the network credential.

Figure 8:
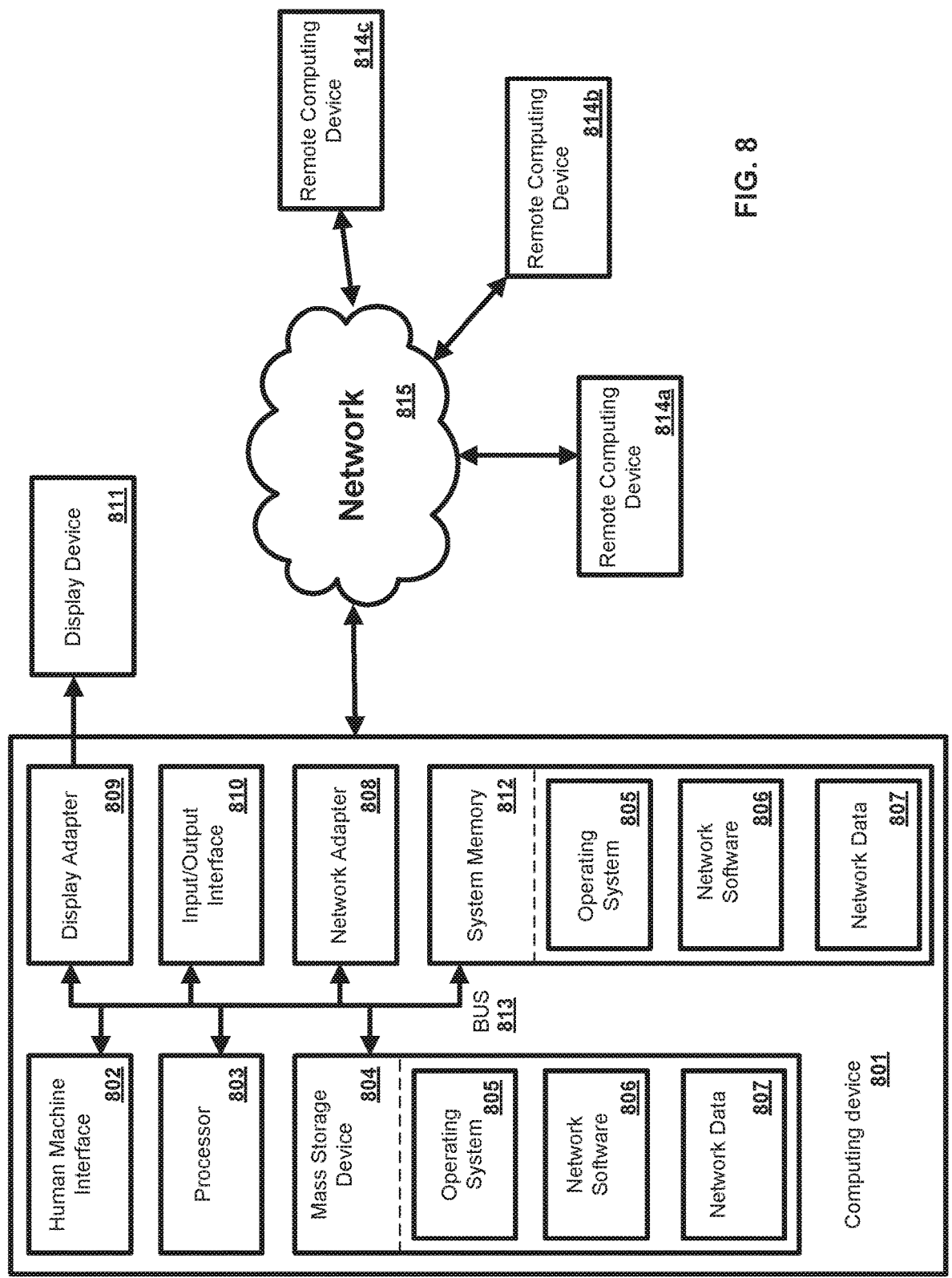
FIG. 8 is a block diagram of another exemplary system.

In an exemplary aspect, the methods and systems can be implemented on a computing system, such as computing device 801 as illustrated in FIG. 8 and described below. By way of example, one or more of the user device 102 and the computing device 104 of FIG. 1 can be a computer as illustrated in FIG. 8. Similarly, the methods and systems disclosed can utilize one or more computers to perform one or more functions in one or more locations. FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 801. The components of the computing device 801 can comprise, but are not limited to, one or more processors or processing units 803, a system memory 812, and a system bus 813 that couples various system components including the processor 803 to the system memory 812. In the case of multiple processing units 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the processor 803, a mass storage device 804, an operating system 805, network software 806, network data 807, a network adapter 808, system memory 812, an Input/Output Interface 810, a display adapter 809, a display device 811, and a human machine interface 802, can be contained within one or more remote computing devices 814a,b,c at physically separate locations, connected through buses of this form, in effect implementing a fully distributed system.

The computing device 801 typically comprises a variety of computer readable media. Exemplary readable media can be any available media that is accessible by the computing device 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data, such as network data 807, and/or program modules, such as operating system 805 and network software 806, that are immediately accessible to and/or are presently operated on by the processing unit 803.

In another aspect, the computing device 801 can also comprise other removable/non-removable, volatile/non-volatile computer storage media. By way of example, FIG. 8 illustrates a mass storage device 804 which can provide non-volatile storage of computer code, computer readable instructions, data structures, program modules, and other data for the computing device 201. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), solid state drives, and the like.

Optionally, any number of program modules can be stored on the mass storage device 804, including by way of example, an operating system 805 and network software 806. Each of the operating system 805 and network software 806 (or some combination thereof) can comprise elements of the programming and the network software 806. Network data 807 can also be stored on the mass storage device 804. Network data 807 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems.

In another aspect, the user can enter commands and information into the computing device 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809. It is contemplated that the computing device 801 can have more than one display adapter 809 and the computer 801 can have more than one display device 811. For example, a display device can be a monitor, an LCD (Liquid Crystal Display), or a projector. In addition to the display device 811, other output peripheral devices can comprise components, such as speakers (not shown) and a printer (not shown) which can be connected to the computing device 801 via Input/Output Interface 810. Any step and/or result of the methods can be output in any form to an output device. Such output can be any form of visual representation, including, but not limited to, textual, graphical, animation, audio, tactile, and the like. The display 811 and computing device 801 can be part of one device, or separate devices.

The computing device 801 can operate in a networked environment using logical connections to one or more remote computing devices 814a,b,c. By way of example, a remote computing device can be a personal computer, portable computer, a smart phone, a server, a router, a network computer, a peer device or other common network node, and so on. Logical connections between the computing device 801 and a remote computing device 814a,b,c can be made via a network 815, such as a local area network (LAN) and a general wide area network (WAN). Such network connections can be through a network adapter 808. A network adapter 808 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 805, are illustrated herein as discrete blocks, although it is recognized that such programs and components reside at various times in different storage components of the computing device 801, and are executed by the data processor(s) of the computer. An implementation of network software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. An apparatus comprising:
   one or more processors; and
   a memory storing processor-executable instructions that, when executed by the one or more processors, cause the apparatus to:
      determine a failed attempt to connect to a first network via an access point based on a first identifier broadcast by the access point;
      connect to a second network via the access point based on a second identifier broadcast by the access point, wherein the second network is configured to provide a secure connection for provisioning services;
      send, to a network device, an identifier of the apparatus;
      receive, based on the identifier of the apparatus, a token;
      send, to the network device via the second network, the token for validation, wherein the token associates the apparatus to the first network;
      receive, based on the token being validated, a network credential associated with the first network; and
      connect, based on the network credential, to the first network.

2. The apparatus of claim 1, wherein the failed attempt to connect to the first network is based on a configuration comprising at least one of: an updated identifier, a new identifier, an updated security element, or a new security element.

3. The apparatus of claim 1, wherein the processor-executable instructions, when executed by the one or more processors, further cause the apparatus to:
   store the token; and
   determine, based on the token being stored, that the token is available.

4. The apparatus of claim 1, wherein the network credential comprises configuration data associated with the first network.

5. The apparatus of claim 1, wherein the first network and the second network are independent networks supported by the access point.

6. A method comprising:
   determining, by a user device, a failed attempt to connect to a first network via an access point based on a first identifier broadcast by the access point;
   connecting, to a second network via a second identifier broadcast by the access point, wherein the second network is configured to provide a secure connection for provisioning services;
   receiving, from a network device via the second network, based on an identifier of the user device being sent to the network device, a token, wherein the token associates the user device to the first network;

sending to the network device via the second network, the token for validation; and receiving, based on the token being validated, a network credential, wherein the network credential facilitates a connection to the first network.

7. The method of claim 6, wherein the failed attempt to connect to the first network is based on a configuration comprising at least one of: an updated identifier, a new identifier, an updated security element, or a new security element.

8. The method of claim 6, wherein the first network and the second network are independent networks supported by the access point.

9. The method of claim 6, further comprising determining, based on the token being stored by the user device, that the token is available.

10. The method of claim 6, wherein the token comprises at least one of: user identification data, security data, account data, or contact information data.

11. The method of claim 6, wherein the network credential comprises configuration data associated with the first network.

12. The method of claim 11, wherein the configuration data comprises at least one of: an updated first identifier or a security element.

13. A method comprising:

connecting, based on a failed attempt to connect to a first network via an access point and a first identifier broadcast by the access point, to a second network via a second identifier broadcast by the access point wherein the second network is configured to provide a secure connection for provisioning services;

sending, to a network device via the second network, an identifier of a user device;

sending, to the network device, a request to validate a token, wherein the token is received based on a verification of the identifier of the user device, wherein the token associates the user device with the first network; and receiving, based on the token being validated, a network credential, wherein the network credential facilitates a connection to the first network.

14. The method of claim 13, wherein the failed attempt to connect to the first network is based on a configuration comprising at least one of: an updated identifier, a new identifier, an updated security element, or a new security element.

15. The method of claim 13, wherein sending the request to validate the token is based on determining that a validated token is not stored by the user device.

16. The method of claim 13, wherein the token comprises at least one of: user identification data, security data, account data, or contact information data.

17. The method of claim 13, wherein the network credential comprises configuration data associated with the first network.

18. The method of claim 17, wherein the configuration data comprises at least one of: an updated first identifier or a security element.

19. The method of claim 17, wherein sending the identifier of the user device comprises sending an encrypted identifier of the user device.

20. The method of claim 13, wherein sending the request to validate the token comprises:

determining that the token is stored by the user device; and sending, based on the determining that the token is stored, the request to validate the token.

* * * * *